United States Patent [19]
Bessacini et al.

[11] Patent Number: 5,828,571
[45] Date of Patent: Oct. 27, 1998

[54] METHOD AND APPARATUS FOR DIRECTING A PURSUING VEHICLE TO A TARGET WITH EVASION CAPABILITIES

[75] Inventors: Anthony F. Bessacini, Narragansett; Robert F. Pinkos, Saunderstown, both of R.I.

[73] Assignee: The United States of America as represented by the Secretary of the Navy, Washington, D.C.

[21] Appl. No.: 521,207

[22] Filed: Aug. 30, 1995

[51] Int. Cl.$^6$ .................................................. G06F 165/00
[52] U.S. Cl. ........................... 364/424.027; 364/423.098; 244/3.11; 244/3.15
[58] Field of Search .................... 364/423.098, 424.027, 364/424.028, 424.032, 462, 516; 318/589; 244/3.1, 3.11, 3.13, 3.14, 3.15, 3.16, 3.19; 114/21.1, 21.2, 21.3, 23

[56] References Cited

U.S. PATENT DOCUMENTS

| | | | |
|---|---|---|---|
| 3,260,478 | 7/1966 | Welti | 244/3.14 |
| 3,643,616 | 2/1972 | Jones | 114/21.2 |
| 3,784,800 | 1/1974 | Wiloteaux | 244/3.15 |
| 4,732,349 | 3/1988 | Maurer | 244/3.13 |
| 5,080,300 | 1/1992 | Stubbs et al. | 244/3.14 |
| 5,118,050 | 6/1992 | Arnold et al. | 244/3.14 |
| 5,319,556 | 6/1994 | Bessacini | 364/516 |
| 5,429,322 | 7/1995 | Waymeyer | 244/3.15 |
| 5,436,832 | 7/1995 | Bessacini et al. | 244/3.13 |

*Primary Examiner*—Gary Chin
*Attorney, Agent, or Firm*—Michael J. McGowan; Prithvi C. Lall; Michael F. Oglo

[57] ABSTRACT

A method and apparatus for directing a pursuing vehicle, such as a torpedo, on an intercept trajectory from a launching vehicle to a target vehicle with evasion capabilities. Models of the pursuing vehicle and evading target provide proposed trajectories based upon various environmental considerations. A guidance system uses estimates of initial operating parameter solutions, such as gyro angle, alertment time and intercept time, to begin a convergent, iterative process that defines final operating parameter solutions from which the guidance parameters are determined and transferred to the pursuing vehicle at launch. These parameters take into account various evasive strategies that a target vehicle might use to avoid being intercepted by the pursuing vehicle.

29 Claims, 8 Drawing Sheets

METHOD AND APPARATUS FOR DIRECTING A PURSUING VEHICLE TO A TARGET WITH EVASION CAPABILITIES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to trajectory control and more specifically to a method and apparatus for providing guidance parameters at launch that direct a pursuing vehicle from a launching vehicle to a target vehicle capable of evasive maneuvering after the target vehicle becomes alerted to the presence of the pursuing vehicle.

(2) Description of the Prior Art

The trajectory control of a pursuing vehicle can be classified as post-launch or pre-launch control. In post-launch control, guidance information is sent from the launching vehicle to guide the pursuing vehicle to the target. The following United States Letters Patent disclose such post-launch trajectory control systems:

U.S. Pat. No. 3,260,478 (1966) Welti
U.S. Pat. No. 3,643,616 (1972) Jones
U.S. Pat. No. 3,784,800 (1974) Willoteaux
U.S. Pat. No. 5,319,556 (1994) Bessacini The Welti patent discloses the control of a first object in dependence upon a position of a second object for collision or anti-collision purposes. A regulator, that controls the travel and includes a travel control member for the first object, receives positional information of the first and second objects as a pilot magnitude and a reference magnitude. One of the positional informations is delayed in dependence upon a timing interval proportional to the time change of the quotient of the distance information of the two objects. The regulator subsequently supplies an output magnitude to the travel control member that represents the time differentials between the angular co-ordinates of the first and second objects modified by a disturbance magnitude.

The Jones patent discloses a method and apparatus for guiding a torpedo along a collision course to a moving target ship. A control system on the launching vehicle sends guidance parameters over a communication cable to maintain a predetermined, substantially constant lead angle with respect to the target ship by adjusting torpedo speed as the torpedo travels toward an anticipated collision.

In the Willoteaux patent a trajectory control system calculates the distance between a moving body and other moving or stationary objects by taking account of the speeds and direction of each. The control system simulates a series of hypothetical trajectories diverging on either side of the actual trajectory until a hypothetical trajectory is determined which satisfies various imperatives. The system then instructs the moving body control system to change the linear and or angular speed thereof so that the moving body follows the latter trajectory.

The Bessacini patent discloses an adaptive trajectory apparatus and method for providing, after launch, vehicle control commands to steer an underwater vehicle launch from a vessel toward a contact. As commands produced by this system transfer between the launching vessel and the launched vehicle over a communications link.

As generally found in prior art post-launch control systems, a pursuing vehicle exits a launching vehicle. Control systems on the launching vehicle monitor the relative positions of the pursuing vehicle and a target and control the pursuing vehicle by the transfer of information between the launching vehicle and the pursuing vehicle over communications link. When the launching vehicle is a submarine and the pursuing vehicle is a torpedo, the communications link typically comprises a communications wire. If the pursuing vehicle is a missile the communications typically occurs over some radio link. In either case, post-launch control systems on the launching vehicle issue guidance parameters to guide the pursuing vehicle along some trajectory into a predetermined relationship with the target.

In a pre-launch system, the pursuing vehicle follows a predetermined trajectory after launch that may or may not be programmable prior to launch. However, with either type, the pursuing vehicle leaves the launching vehicle and travels along a known trajectory that may be simple or complicated. With torpedoes, missiles and the like, that may undergo pre-programmed maneuvers, the input guidance parameters may include gyro angles and time lapse signals, such as the time between the launch and the enablement of any instrumentation on the torpedo or missile such as an acoustic seeker on a torpedo.

In order to provide the most accurate pre-launch guidance parameters to the pursuing vehicle, it is necessary that the interval between the time a last estimate of target state is made and the time a pursuing vehicle is launched be quite short. It is during this interval that a prior art pre-launch system must produce the guidance parameters, and this interval has constrained the nature of the analysis required to produce such guidance parameters. For example, prior art pre-launch systems generally assume that the target will maintain a constant velocity even after the target becomes alerted to the presence of the pursuing vehicle. In actual practice, however, a target normally takes evasive action. With prior art pre-launch systems two or more pursuing vehicles travel along the calculated course and one or more offsets from that calculated course to take evasive maneuvers into account.

SUMMARY OF THE INVENTION

Therefore it is an object of this invention to provide a control method and apparatus for producing guidance parameters for use by a pursuing vehicle at launch that take into account potential evasive maneuvers of a target.

Another object of this invention is to provide a control method and apparatus for providing guidance parameters to a pursuing vehicle for use at launch that take into account a time at which the target becomes aware of the pursuing vehicle and the effect of any potential evasive maneuvers thereafter.

Yet another object of this invention is to provide a control method and apparatus for providing guidance parameters to a pursuing vehicle for use at launch a short interval after a launching vehicle obtains an estimate of target vehicle state for producing an intercepting trajectory to an alerted target taking evasive action.

In accordance with this invention guidance parameters are provided for use by a pursuing vehicle at launch to place a pursuing vehicle on an intercept trajectory from a launching vehicle to a target vehicle with evasion capabilities. At the launching vehicle, the control method and apparatus, in response to estimates of current target vehicle state and classification, establishes predetermined target vehicle operating characteristics. The control method and apparatus use a representation of a pursuing vehicle characteristic trajectory derived from a corresponding generic model, a representation of an evading target characteristic trajectory derived from another generic model, and estimates of target vehicle state to produce predetermined operating parameters that characterize a particular trajectory of the pursuing vehicle based upon defined interactions of the representations of the pursuing vehicle and target vehicle trajectories. Iterative processing of functional forms of the trajectories, starting with the initial estimates of the operating parameter solutions, provides successive operating parameters solutions that converge. The pursuing vehicle receives guidance parameters based upon the last target state estimates and the new solutions produced within the update interval of the target estimation process.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6 depicts the trajectory of a pursuing vehicle generated where the target vehicle undertakes an evasive maneuver after alertment.

DESCRIPTION OF THE PREFERRED EMBODIMENT

Figure 1:
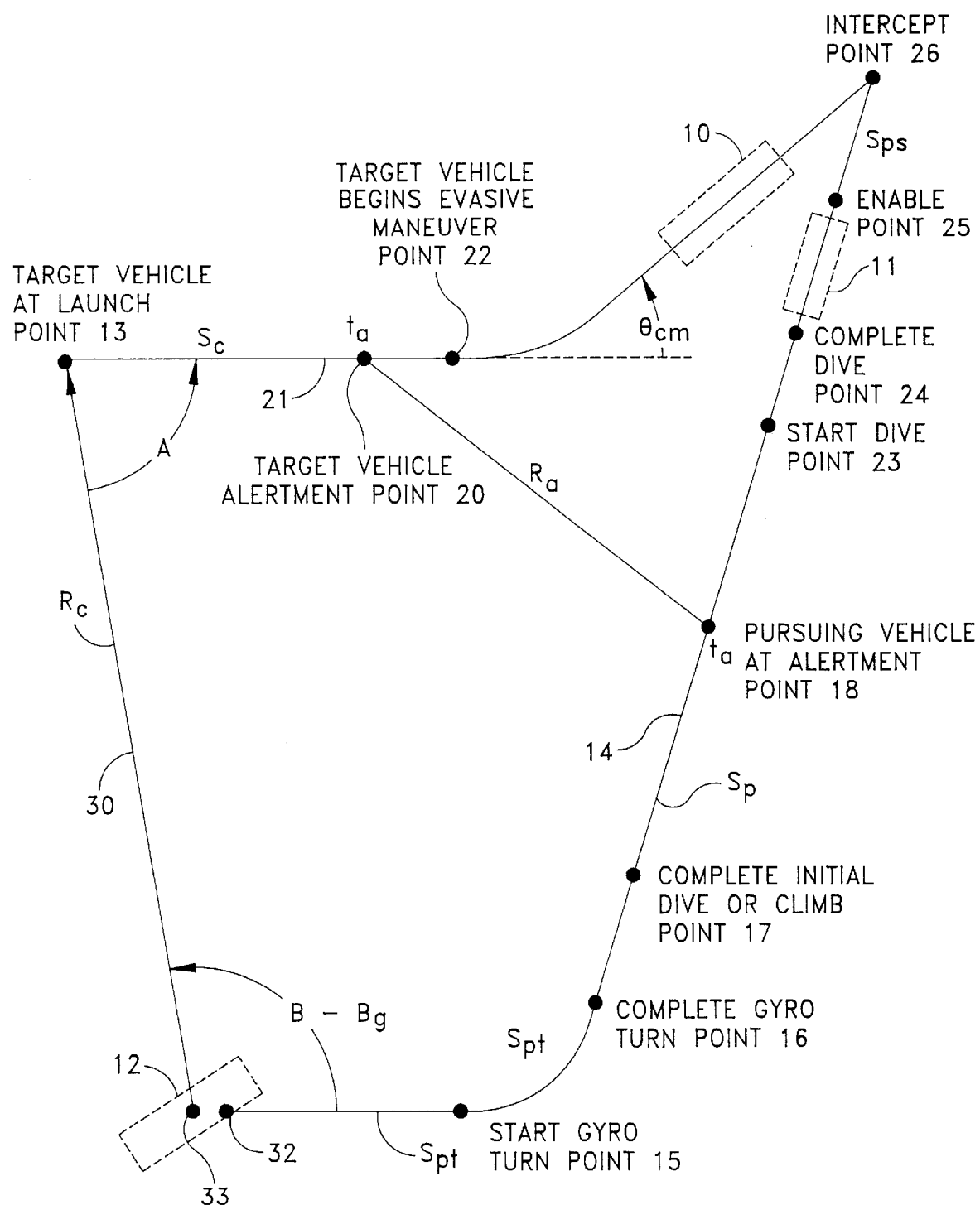
FIG. 1 depicts particular trajectories or tracks of a target vehicle and pursuing vehicle on an intercept trajectory.

FIG. 1 is useful to an understanding of this invention and depicts typical trajectories of a target vehicle 10 that has the capability of maneuvering evasively. It is assumed that at some point in time a launching vehicle 12 detects the presence of a target vehicle 10 and determines current target vehicle state at a point 13. Target vehicle state includes the bearing and range to the target vehicle and its course and speed. After the pursuing vehicle 11 leaves the launching vehicle 12, it travels along a path 14 that is defined by guidance operating parameters supplied just prior to launch. These operating parameters establish the point at which the pursuing vehicle 11 completes a gyro turn onto a intercept trajectory at point 16, the point of the completion of an initial climb or dive at point 17 and the position of the pursuing vehicle at point 18 when the target vehicle becomes aware or is alerted to the presence of the pursuing vehicle. This alertment occurs at point 20 on the track 21 of the target vehicle 10. A short time later, at point 22, the target vehicle begins an evasive maneuver, shown in FIG. 1 as a 45° turn to port.

After alertment at point 18, the pursuing vehicle 11 may begin and complete a second dive at points 23 and 24 respectively. If the pursuing vehicle 11 contains some instrumentation, such as an acoustic seeker, that instrumentation activates at point 25. The pursuing vehicle 11 continues along the path 14 to the intercept point 26.

Figure 2:
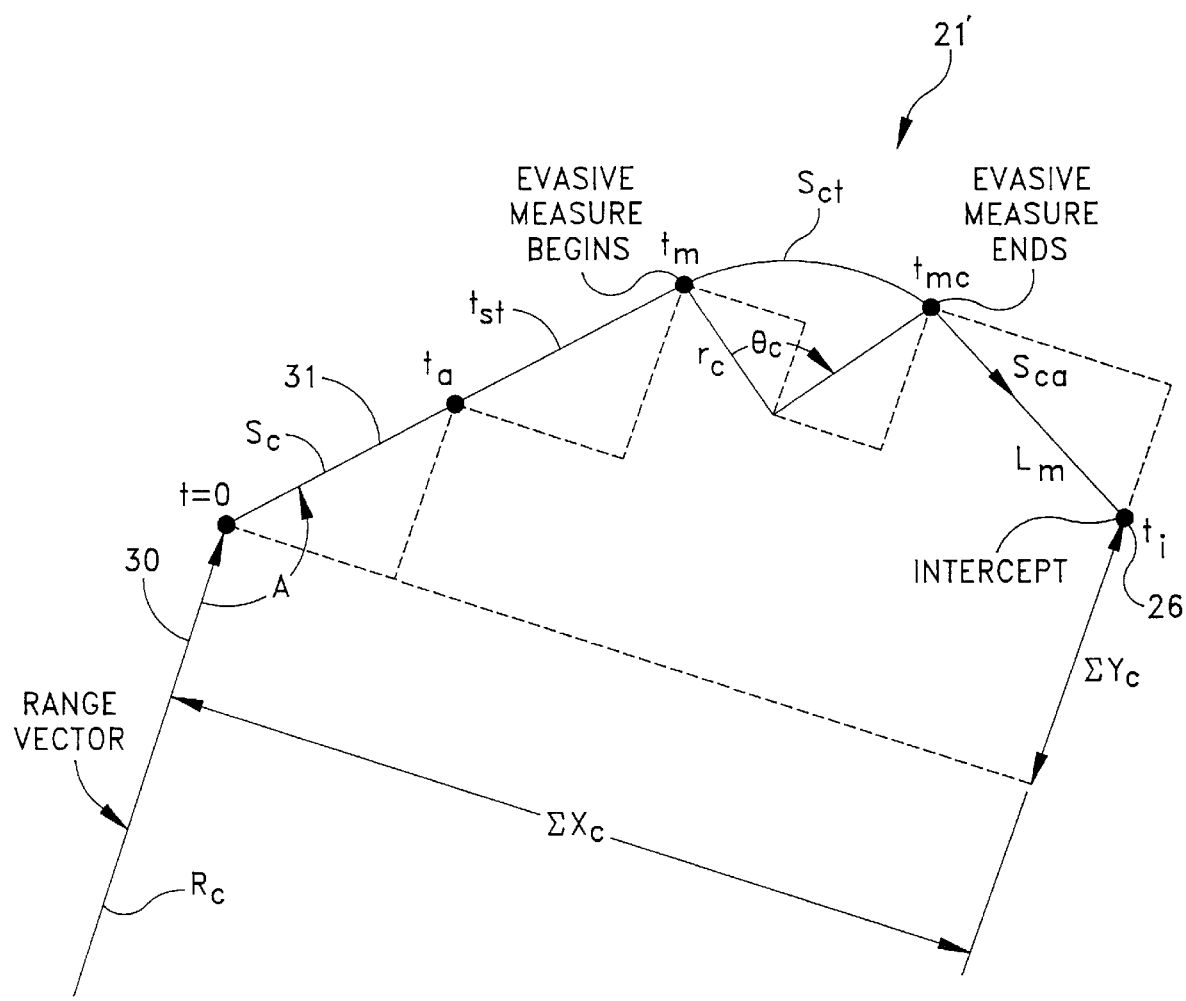
FIG. 2 depicts a generic model for a target vehicle trajectory.

In accordance with this invention, generic models that can be customized for particular events define each of the paths 14 and 21. FIG. 2 depicts a generic model for a target vehicle 10. At t=0, the launching vehicle 12 establishes a range vector 30 and a target velocity vector 31 extending at an angle A with respect to the range vector 30. The generic path can be defined by a sum of X and Y coordinates representing various positions of the target vehicle 10 over time and with respect to a coordinate system aligned with the range vector 30, e.g., a rectangular coordinate system with the Y axis on the range vector 30 and the 0,0 point at the point 33. These times correspond to particular events designated as $t_a$, $t_m$, $t_{mc}$ and $t_i$. The time, $t_a$, corresponds to the time at which the target vehicle 10 detects the pursuing vehicle 11; it is called the alertment time. The time, $t_m$, represents the beginning of an evasive maneuver; the time, $t_{mc}$, the end of that evasive maneuver; the time, $t_i$, the intercept time. The evasive maneuver can be defined as a fixed radius turn having a radius, $r_c$, and an angle, $\theta_{cm}$. After the target vehicle 10 completes an evasive maneuver, it is assumed that the target vehicle continues along a straight line, $S_{ca}$, to an intercept time, $t_i$. The distance from the end of the maneuver to the intercept is $L_m$. Thus the change in positions from $t_o$ to $t_a$ along an X axis perpendicular to and across the line of sight represented by the range vector 30 is $-S_c t_a \sin(A)$; along the Y axis in the line of sight axis, the change is $-S_c t_a \cos(A)$. The position change between the alertment time, $t_a$, and the beginning of the evasive maneuver at $t_m$ can be defined as $-S_c(t_m-t_a)\sin(A)$ across the line of sight and $-S_c(t_m-t_a)\cos(A)$ along the line of sight. The evasive maneuver from $t_m$ to $t_{mc}$ can be defined in terms of the radius, $r_c$, and the angle, $\theta_c$, as $r_c \cos(A) - r_c \cos(A-\theta_c)$ across the line of sight and $-r_c \sin(A) + r_c \sin(A-\theta_c)$ along the line of sight. The change in position from the end of the evasive maneuver to the intercept are given by $-L_m \sin(A-\theta_c)$ and $-L_m \cos(A-\theta_c)$ respectively across and along the line of sight.

Given these incremental definitions, the generic model path 21' in FIG. 2 for a target vehicle 10 is:

$$\Sigma X_c = -S_c t_a \sin(A) - S_c(t_m-t_a)\sin(A) + r_c \cos(A) - r_c \cos(A-\theta_c) - L_m \sin(A-\theta_c) \quad (1)$$

and $$\Sigma Y_c = -S_c t_a \cos(A) - S_c(t_m-t_a)\cos(A) - r_c \sin(A) + r_c \sin(A-\theta_c) - L_m \cos(A-\theta_c) \quad (2)$$

where for $$t_i > t_{mc} : L_m = S_{ca}(t_i - t_{mc}) \text{ and } \theta_c = \theta_{cm}$$

and where for $$t_i \leq t_{mc} : L_m = 0 \text{ and } \theta_c = \theta_{cdot}(t_i - t_m)$$

Figure 3:
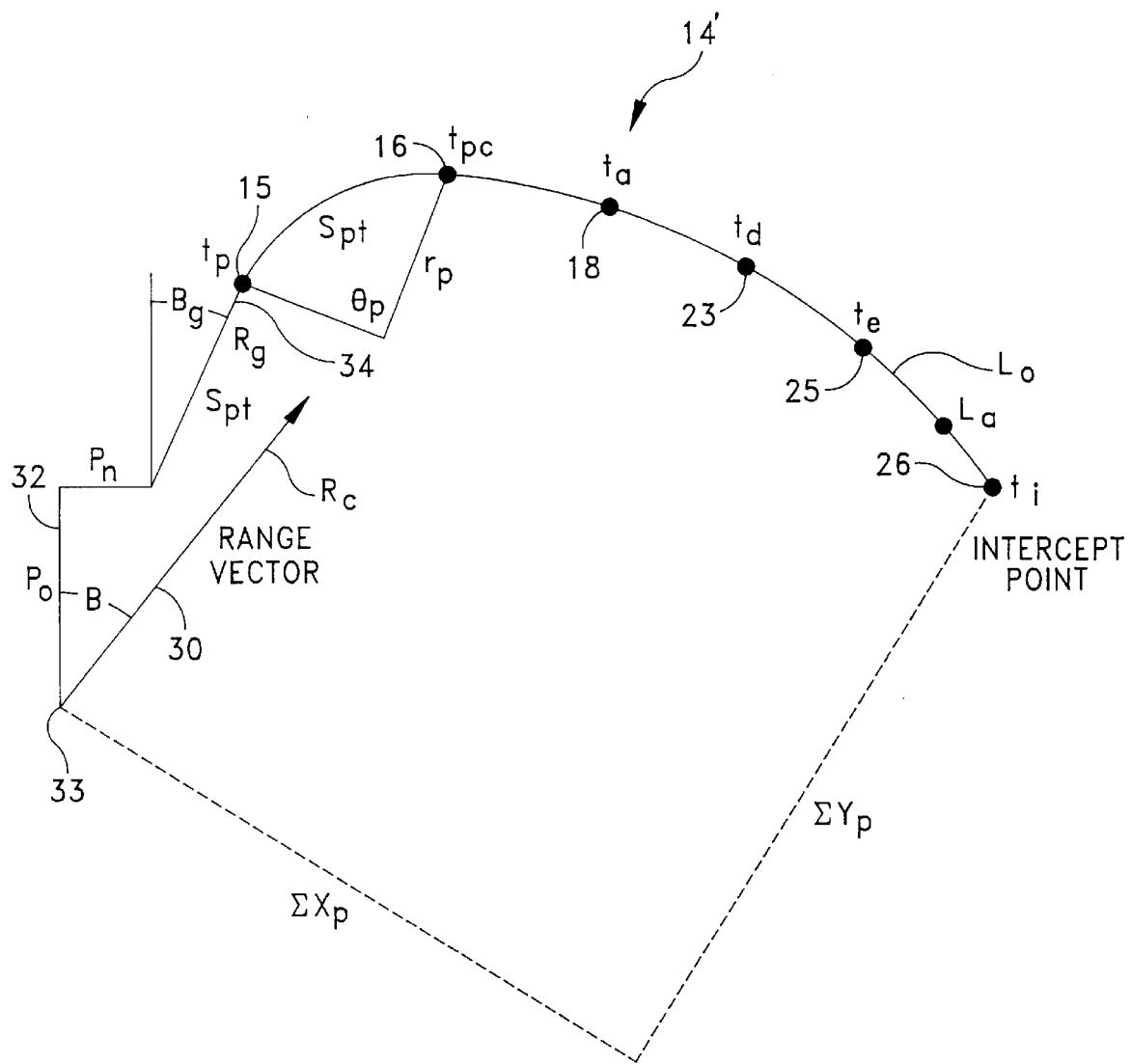
FIG. 3 represents a generic model for a pursuing vehicle trajectory.

FIG. 3 depicts a generic trajectory 14' for the pursuing vehicle 11. It depicts point 18 as the alertment time, $t_a$, and point 26 as the time of intercept, $t_i$. Assuming that the axis 32 of the launching vehicle 12 is vertical in FIG. 3, the range vector 30 to the target has a bearing B relative to that axis 32. Point 33 in FIGS. 1 and 3 indicates the position of the launching vehicle 12 at the time of launch. In FIG. 3 the distances $P_0$ and $P_n$ define offsets to the center of the torpedo from the reference point of the launching vehicle 12. Segment 34 represents the initial trajectory of the pursuing vehicle 11 for a distance, $R_g$, along an angle, $B_g$, relative to the axis of the launching vehicle. These relationships establish initial launch parameters that co-ordinate the position of the pursuing vehicle at the start of the gyro turn at point 15 in FIGS. 1 and 3; the parameters are: (1) $P_0 \sin(B) - P_n \cos(B) + R_g \sin(B-Bg)$ across the line of sight, and (2) $P_0 \cos(B) + P_n \sin(B) + R_g \cos(B-Bg)$ parallel to the line of sight. An analysis of the remainder of the generic path 14' shows that the path can be defined by $X_p$ and $Y_p$ as follows:

and $$\Sigma X_p = +P_o\sin(B) - P_n\cos(B) + R_g\sin(B - Bg) - \qquad (3)$$
$$r_p\cos(B - Bg) + r_p\cos(\theta_p - (B - Bg)) -$$
$$S_p(t_a - t_{pc})\sin\left\{\theta_p - (B - Bg) + \left(\frac{D_r}{2}\right)(t_a - t_{pc})\right\} -$$
$$S_p(t_d - t_a)\sin\left\{\theta_p - (B - Bg) + D_r(t_a - t_{pc}) + \left(\frac{D_r}{2}\right)(t_d - t_a)\right\} -$$
$$S_{pd}(t_e - t_d)\sin\left\{\theta_p - (B - Bg) + D_r(t_a - t_{pc}) + D_r(t_d - t_a) + \left(\frac{D_r}{2}\right)(t_e - t_d)\right\} -$$
$$S_{ps}(t_i - t_e)\sin\left\{\theta_p - (B - Bg) + D_r(t_a - t_{pc}) + D_r(t_d - t_a) + D_r(t_e - t_d) + \left(\frac{D_r}{2}\right)(t_i - t_e)\right\} -$$
$$L_a\sin\{\theta_p - (B - Bg) + D_r(t_a - t_{pc}) + D_r(t_d - t_a) + D_r(t_e - t_d) + D_r(t_i - t_e)\}$$

$$\Sigma Y_p = +P_o\cos(B) + P_n\sin(B) + R_g\cos(B - Bg) + \qquad (4)$$
$$r_p\sin(B - Bg) + r_p\sin(\theta_p - (B - Bg)) +$$
$$S_p(t_a - t_{pc})\cos\left\{\theta_p - (B - Bg) + \left(\frac{D_r}{2}\right)(t_a - t_{pc})\right\} +$$
$$S_p(t_d - t_a)\cos\left\{\theta_p - (B - Bg) + D_r(t_a - t_{pc}) + \left(\frac{D_r}{2}\right)(t_d - t_a)\right\} +$$
$$S_{pd}(t_e - t_d)\cos\left\{\theta_p - (B - Bg) + D_r(t_a - t_{pc}) + D_r(t_d - t_a) + \left(\frac{D_r}{2}\right)(t_e - t_d)\right\} +$$
$$S_{ps}(t_i - t_e)\cos\left\{\theta_p - (B - Bg) + D_r(t_a - t_{pc}) + D_r(t_d - t_a) + D_r(t_e - t_d) + \left(\frac{D_r}{2}\right)(t_i - t_e)\right\} +$$
$$L_a\cos\{\theta_p - (B - Bg) + D_r(t_a - t_{pc}) + D_r(t_d - t_a) + D_r(t_e - t_d) + D_r(t_i - t_e)\}$$

where $r_p$ and $\theta_p$ represent the radius and included angle of the gyro turn from point 15 to point 16. In these equations, $t_d$ represents the time at the dive point 23 and $t_c$ the time at the enable point 25. $L_O$ represents a distance characteristic of a sensory system, such as an acoustic seeker on a torpedo, and $L_a$ represents an acoustic offset distance or guidance distance. $D_r$ represents a drift rate for the torpedo.

Figure 4:
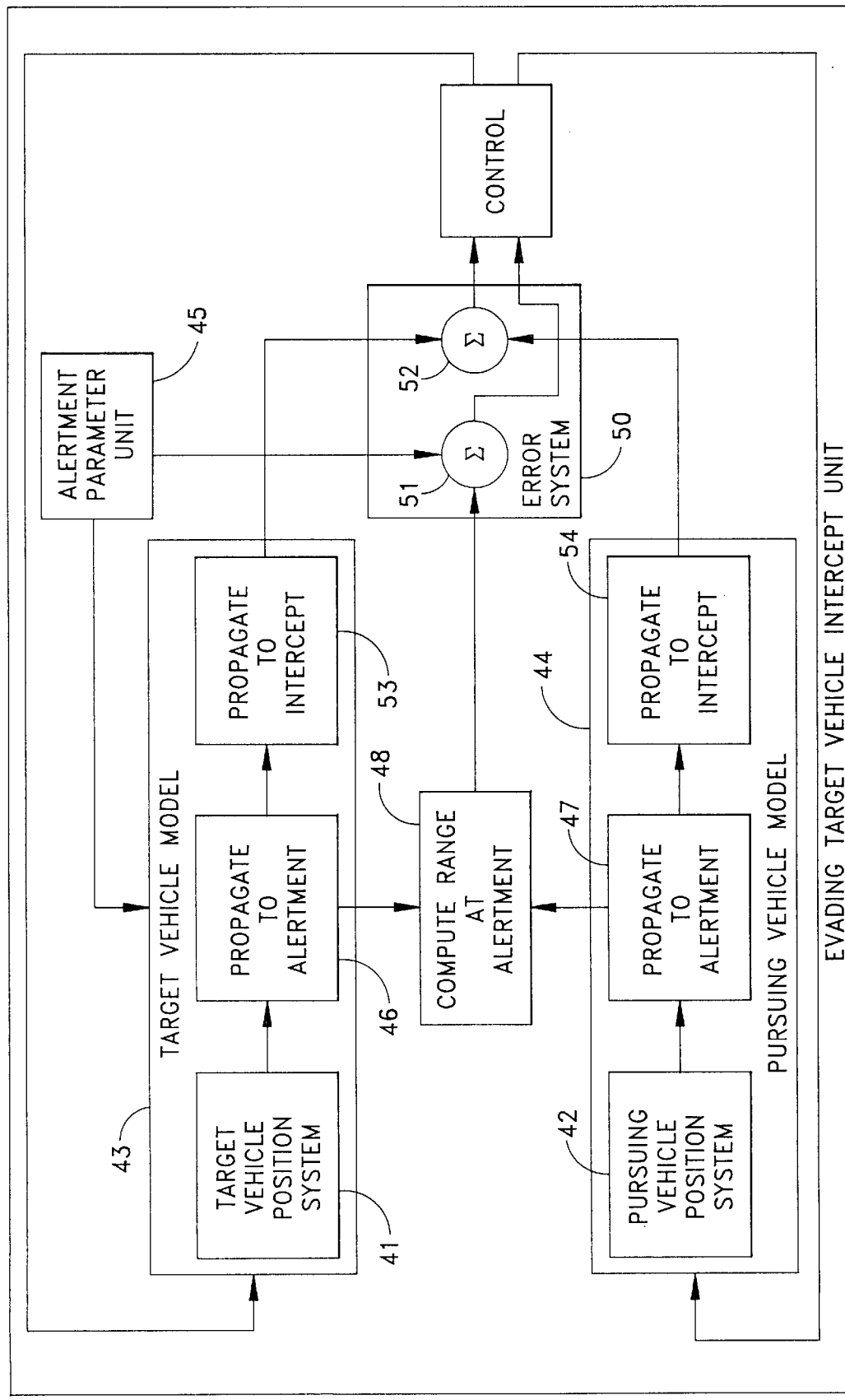
FIG. 4 is a block diagram depicting an evading target vehicle intercept unit constructed in accordance with this invention.

The target vehicle intercept unit 40 shown in FIG. 4 includes a target vehicle position system 41 that implements position equations (1) and (2) and a pursuing vehicle position system 42 that implements equations (3) and (4). Each system includes equipment, not shown but known in the art, for providing particular parameters, such as the turning radius, $r_c$, evasion angle, $\theta_{cm}$, and rate of turn, $\theta_{cdot}$, shown in FIG. 2. Thus a target vehicle position system 41 generates a representation of an evading target characteristic trajectory based upon the generic model shown in FIG. 2, estimations of the target vehicle state, known characteristics of that target vehicle 10 and estimations of particular maneuvers.

Likewise the pursuing vehicle model 44 uses the pursuing vehicle position system 42 to produce a representation of the pursuing vehicle characteristic trajectory based upon known characteristics of the pursuing vehicle 11.

The range, $R_a$, between point 18 and point 20 in FIG. 1 at the time of alertment $t_a$ constitutes a target vehicle detection range at alertment. Stored information about the target vehicle typically provides the alertment range to the unit 40. Alternatively, an operator can enter the alertment range. In FIG. 4, the source of that range is an alertment parameter unit 45.

This alertment range constrains the computed range between the target vehicle and pursuing vehicle to be equal to the contact detection range at alertment. Using pre-alertment contact target vehicle and pursuing vehicle trajectory components along the line of sight and across the line of sight as defined by the range vector 30, propagate-to-alertment systems 46 and 47 in the target vehicle model 43 and pursuing vehicle model 44, respectively, provide information to a compute-range-at-alertment system 48 that acts in response to:

$$R_a^2 = +\left[P_o\sin(B) - P_n\cos(B) + R_g\sin(B - Bg) - \right. \qquad (5)$$
$$r_p\cos(B - Bg) + r_p\cos(\theta_p - (B - Bg)) -$$
$$\left. S_p(t_a - t_{pc})\sin\left\{\theta_p - (B - Bg) + \left(\frac{D_r}{2}\right)(t_a - t_{pc})\right\} + S_c t_a\sin(A)\right]^2 +$$
$$\left[R_c - S_c t_a\cos(A) - \left\{P_o\cos(B) + P_n\sin(B) + R_g\cos(B - Bg) + r_p\sin(B - Bg) + r_p\sin(\theta_p - (B - Bg)) + \right.\right.$$
$$\left.\left. S_p(t_a - t_{pc})\cos\left\{\theta_p - (B - Bg) + \left(\frac{D_r}{2}\right)(t_a - t_{pc})\right\}\right\}\right]^2$$

An error system 50 includes an error unit 51 that, as will become apparent, produces the alertment range error at alertment.

Another error unit 52 produces positional errors with respect to the target vehicle and pursuing vehicle positions across and along the line of sight at intercept. These signals are provided by a propagate-to-intercept system 53 in the target vehicle model 43 and a propagate-to-intercept system 54 in the target vehicle model 44. More specifically, the positional errors in the X and Y directions at intercept result from equating target vehicle and pursuing vehicle components as follows:

$$\Sigma X_c = +\Sigma X_p, \text{ or } - \quad (6)$$

$$S_c t_a \sin(A) - S_c(t_m - t_a)\sin(A) + r_c \cos(A) - r_c \cos(A - \theta_c) - L_m \sin(A - \theta_c)$$

$$= P_o \sin(B) - P_n \cos(B) + R_g \sin(B - Bg) - r_p \cos(B - Bg) + r_p \cos(\theta_p - (B - Bg)) -$$

$$S_p(t_a - t_{pc})\sin\left\{\theta_p - (B - Bg) + \left(\frac{D_r}{2}\right)(t_a - t_{pc})\right\} -$$

$$S_p(t_d - t_a)\sin\left\{\theta_p - (B - Bg) + \left(\frac{D_r}{2}\right)(t_d + t_a - 2t_{pc})\right\} -$$

$$S_{pd}(t_a - t_d)\sin\left\{\theta_p - (B - Bg) + \left(\frac{D_r}{2}\right)(t_e + t_d - 2t_{pc})\right\} -$$

$$S_{ps}(t_i - t_e)\sin\left\{\theta_p - (B - Bg) + \left(\frac{D_r}{2}\right)(t_i + t_e - 2t_{pc})\right\} -$$

$$L_a \sin\{\theta_p - (B - Bg) + D_r(t_i - t_{pc})\}$$

and $$R_c + \Sigma Y_c = \Sigma Y_p, \text{ or } R_c - \quad (7)$$

$$S_c t_a \cos(A) - S_c(t_m - t_a)\cos(A) - r_c \sin(A) + r_c \sin(A - \theta_c) - L_m \cos(A - \theta_c)$$

$$= P_o \cos(B) + P_n \sin(B) + R_g \cos(B - Bg) + r_p \sin(B - Bg) + r_p \sin(\theta_p - (B - Bg)) +$$

$$S_p(t_a - t_{pc})\cos\left\{\theta_p - (B - Bg) + \left(\frac{D_r}{2}\right)(t_a - t_{pc})\right\} +$$

$$S_p(t_d - t_a)\cos\left\{\theta_p - (B - Bg) + \left(\frac{D_r}{2}\right)(t_d + t_a - 2t_{pc})\right\} +$$

$$S_{pd}(t_e - t_d)\cos\left\{\theta_p - (B - Bg) + \left(\frac{D_r}{2}\right)(t_e + t_d - 2t_{pc})\right\} +$$

$$S_{ps}(t_i - t_e)\cos\left\{\theta_p - (B - Bg) + \left(\frac{D_r}{2}\right)(t_i + t_e - 2t_{pc})\right\} +$$

$$L_a \cos\{\theta_p - (B - Bg) + D_r(t_i - t_{pc})\}.$$

By inspection of FIGS. 1 through 3 the following relationships exist:

$$t_m = t_a + t_{st}$$

$$t_{mc} = t_a + t_{st} + r_c(\theta_{cm})/S_{ct}$$

$$t_{pc} = [R_g + r_p(\theta_p)]/S_{pt}$$

$$t_p = R_g/S_{pt}$$

$$t_{srch} = L_0/S_{ps}$$

$$t_e - t_d = L_d/S_{pd}$$

$$t_{dive} = L_d/S_{pd}$$

$$L_{xr} = P_0 \sin(B) - P_n \cos(B) + R_g \sin(B - Bg)$$

$$L_{xc} = r_c \cos(A) - S_c t_{st} \sin(A)$$

$$L_{yr} = P_0 \cos(B) + P_n \sin(B) + R_g \cos(B - Bg)$$

$$L_{yc} = R_c - r_c \sin(A) - S_c t_{st} \cos(A)$$

$$B_1 = (B - Bg)$$

$$B_2 = (L_0/S_{ps} + L_d/S_{pd})$$

$t_m = t_a + t_{st}$ where $t_{st}$ represents the reaction time of the target vehicle between alertment and the beginning of an evasive maneuver, $t_{mc} = t_a + t_{st} + r_c(\theta_{cm})/S_{ct}$ where $S_{ct}$ represents speed of the target vehicle during the evasive turn, $t_{pc} = [R_g + r_p(\theta_p)]/S_{pt}$ where $S_{pt}$ equals the speed of the pursuing vehicle during the gyro turn, $t_p = R_g/S_{pt}$ where $S_{pt}$ is also the speed with which the pursuing vehicle 11 leaves the launching vehicle 12, $t_{srch} = L_0/S_{ps}$ where $L_0$ represents the seeker offset distance and $S_{ps}$ equals the speed of the pursuing vehicle in a search phase, $t_{dive} = L_d/S_{pd}$ where $L_d$ is the distance from point 23 to point 24 in FIG. 1, $t_e - t_d = (L_d)/S_{pd}$ where $L_d$ represents the distance travelled by the pursuing vehicle during a dive phase and $S_{pd}$ represents the speed of the pursuing vehicle during the dive.

Substituting these relationships in equations (6) and (7) yields:

$$0 = L_{xr} - L_{xc} - r_p\cos(B_1) + r_c\cos(A - \theta_c) + S_c t_a \sin(A) +$$
$$L_m \sin(A - \theta_c) + r_p \cos(\theta_p - B_1) -$$
$$S_p\left(t_a - \frac{R_g + r_p\theta_p}{S_{pt}}\right) \sin\left\{\theta_p - B_1 + \left(\frac{D_r}{2}\right)\left(t_a - \frac{R_g + r_p\theta_p}{S_{pt}}\right)\right\} -$$
$$S_p\left(t_e - t_a - \frac{L_d}{S_{pd}}\right) \sin\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} -$$
$$L_d \sin\left\{\theta_p - B_1 + \left(\frac{D_r}{2}\right)\left(2t_e - \frac{L_d}{S_{pd}} - 2\frac{R_g + r_p\theta_p}{S_{pt}}\right)\right\} -$$
$$S_{ps}(t_i - t_e)\sin\left\{\theta_p - B_1 + \left(\frac{D_r}{2}\right)\left(t_i + t_e - 2\frac{R_g + r_p\theta_p}{S_{pt}}\right)\right\} -$$
$$L_a \sin\left\{\theta_p - B_1 + D_r\left(t_i - \frac{R_g + r_p\theta_p}{S_{pt}}\right)\right\} \tag{8}$$

and $$0 = L_{yr} - L_{yc} + r_p\sin(B_1) - r_c\sin(A - \theta_c) + S_c t_a \cos(A) +$$
$$L_m \cos(A - \theta_c) + r_p \sin(\theta_p - B_1) +$$
$$S_p\left(t_a - \frac{R_g + r_p\theta_p}{S_{pt}}\right) \cos\left\{\theta_p - B_1 + \left(\frac{D_r}{2}\right)\left(t_a - \frac{R_g + r_p\theta_p}{S_{pt}}\right)\right\} +$$
$$S_p\left(t_e - t_a - \frac{L_d}{S_{pd}}\right) \cos\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} +$$
$$(L_d)\cos\left\{\theta_p - B_1 + \left(\frac{D_r}{2}\right)\left(2t_e - \frac{L_d}{S_{pd}} - 2\frac{R_g + r_p\theta_p}{S_{pt}}\right)\right\} +$$
$$S_{ps}(t_i - t_e)\cos\left\{\theta_p - B_1 + \left(\frac{D_r}{2}\right)\left(t_i + t_e - 2\frac{R_g + r_p\theta_p}{S_{pt}}\right)\right\} +$$
$$L_a \cos\left\{\theta_p - B_1 + D_r\left(t_i - \frac{R_g + r_p\theta_p}{S_{pt}}\right)\right\} \tag{9}$$

It is possible to define the time, $t_e$, to turn on an acoustic seeker or other instrumentation or feature in two ways, either (1) the time to travel a fixed turn-on distance, $L_{sto}$, from the launch point or (2) as a time to travel a fixed seeker offset distance, $L_o$. If $L_{sto}$ is selected, then $$t_e = \frac{L_{sto} - L_d}{S_p} + \frac{L_d}{S_{pd}} \tag{10}$$

otherwise $$t_e = t_i - \frac{L_o}{S_{ps}} \tag{11}$$

Likewise substituting the foregoing relationships in equation (5) yields an alertment range error defined by:

$$0 = \left[L_{xr} - r_p\cos(B_1) + r_p\cos(\theta_p - B_1) - S_p\left(t_a - \frac{R_g + r_p\theta_p}{S_{pt}}\right)\sin\left\{\theta_p - B_1 + \left(\frac{D_r}{2}\right)\left(t_a - \frac{R_g + r_p\theta_p}{S_{pt}}\right)\right\} + S_c t_a \sin(A)\right]^2 +$$
$$\left[R_c - S_c t_a \cos(A) - \left\{L_{yr} + r_p\sin(B_1) + r_p\sin(\theta_p - B_1) + S_p\left(t_a - \frac{R_g + r_p\theta_p}{S_{pt}}\right)\cos\left\{\theta_p - B_1 + \left(\frac{D_r}{2}\right)\left(t_a - \frac{R_g + r_p\theta_p}{S_{pt}}\right)\right\}\right\}\right]^2 - R_a^2 \tag{12}$$

The evading target vehicle intercept unit 40 operates in accordance with equations (8), (9) and (12) to generate control updates required to converge to an intercept solution. As previously indicated, these equations are not readily solved because they are transcendental in nature and do not lend themselves to a solution in a closed form. In accordance with this invention, however, initial estimates of operating parameter solutions that characterize a particular trajectory of the pursuing vehicle based upon defined interactions of the representations of the pursuing vehicle and target vehicle trajectories can be produced. Then iterative processing provides successive operating parameter solutions that converge to provide a set of guidance parameters for the pursuing vehicle. In accordance with this invention, the guidance parameters are generated from the numerical solution that exhibits particularly rapid convergence characteristics and accurate estimates.

Expressing equations (8), (9) and (12) as general functions of the problem unknowns and performing a Taylor series expansion yields:

$$e(t_a, t_i, \theta_p) = e(t_{a_i}, t_{i_i}, \theta_{p_i}) + h\partial e/\partial t_a|_i + j\partial e/\partial t_i|_i + k\partial e/\partial \theta_p|_i + \ldots \quad (13)$$
$$= 0$$

and $$f(t_a, t_i, \theta_p) = f(t_{a_i}, t_{i_i}, \theta_{p_i}) + h\partial f/\partial t_a|_i + j\partial f/\partial t_i|_i + k\partial f/\partial \theta_p|_i + \ldots \quad (14)$$
$$= 0$$

and $$g(t_a, t_i, \theta_p) = g(t_{a_i}, t_{i_i}, \theta_{p_i}) + h\partial g/\partial t_a|_i + j\partial g/\partial t_i|_i + k\partial g/\partial \theta_p|_i + \ldots \quad (15)$$
$$= 0$$

where, $$\partial e/\partial t_a|_i = \partial e/\partial t_a|_{t_a=t_{ai}, t_i=t_{ii}, \theta_p=\theta_{pi}}, \quad (16)$$

and, $$t_a = t_{a_i} + h, \; t_i = t_{i_i} + j, \; \theta_p = \theta_{p_i} + k. \quad (17)$$

Neglecting the higher order terms, the solution for this linear set of three expressions with three unknowns is:

$$h = \frac{C22(g_iC13 - e_iC33) + C23(e_iC32 - g_iC12) + f_i(C33C12 - C13C32)}{\Delta} \quad (18)$$

and $$j = \frac{f_i(C31C13 - C11C33) + C23(g_iC11 - e_iC31) + C21(e_iC33 - g_iC13)}{\Delta} \quad (19)$$

and $$k = \frac{C22(e_iC31 - g_iC11) + f_i(C32C11 - C12C31) + C21(g_iC12 - e_iC32)}{\Delta} \quad (20)$$

and $$\Delta = C11(C22C33 - C32C23) + \quad (21)$$
$$C12(C23C31 - C33C21) + C13(C21C32 - C31C22)$$

where $e_i$, $f_i$ and $g_i$ are given by equations (8), (9) and (12) respectively. The partial derivatives in equations (18) through (21) are:

$$(22)$$

$$
\begin{aligned}
C11 &= \frac{\partial e}{\partial t_a} \\
&= r_c \frac{\partial \theta_c}{\partial t_a} \sin(A - \theta_c) + S_c \sin(A) - \\
&\quad L_m \frac{\partial \theta_c}{\partial t_a} \cos(A - \theta_c) + \frac{\partial L_m}{\partial t_a} \sin(A - \theta_c) - \\
&\quad S_p \left( t_a - \frac{R_g + r_p \theta_p}{S_{pt}} \right)\left( \frac{D_r}{2} \right) \cos\left\{ \theta_p - B_1 + \left( \frac{D_r}{2} \right)\left( t_a - \frac{R_g + r_p \theta_p}{S_{pt}} \right) \right\} - \\
&\quad S_p \sin\left\{ \theta_p - B_1 + \left( \frac{D_r}{2} \right)\left( t_a - \frac{R_g + r_p \theta_p}{S_{pt}} \right) \right\} - \\
&\quad S_p \left( t_e - t_a - \frac{L_d}{S_{pd}} \right)\left( \frac{D_r}{2} \right) \cos\left\{ \theta_p - B_1 + \left( \frac{D_r}{2} \right)\left( t_a + t_e - \frac{L_d}{S_{pd}} - 2\frac{R_g + r_p \theta_p}{S_{pt}} \right) \right\} + \\
&\quad S_p \sin\left\{ \theta_p - B_1 + \left( \frac{D_r}{2} \right)\left( t_a + t_e - \frac{L_d}{S_{pd}} - 2\frac{R_g + r_p \theta_p}{S_{pt}} \right) \right\}
\end{aligned}
$$

and $$
\begin{aligned}
C12 = {} & \frac{\partial e}{\partial t_i} \qquad (23)\\
= {} & r_c \frac{\partial \theta_c}{\partial t_i} \sin(A - \theta_c) - L_m \frac{\partial \theta_c}{\partial t_i} \cos(A - \theta_c) + \frac{\partial L_m}{\partial t_i} \sin(A - \theta_c) -\\
& S_{ps}(t_i - t_e)\left(\frac{D_r}{2}\right)\left(1 + \frac{\partial t_e}{\partial t_i}\right) \cdot \\
& \cos\left\{\theta_p - B_1 + \left(\frac{D_r}{2}\right)\left(t_i + t_e - 2\frac{R_g + r_p\theta_p}{S_{pt}}\right)\right\} -\\
& S_{ps}\left(1 - \frac{\partial t_e}{\partial t_i}\right)\sin\left\{\theta_p - B_1 + \left(\frac{D_r}{2}\right)\left(t_i + t_e - 2\frac{R_g + r_p\theta_p}{S_{pt}}\right)\right\} -\\
& L_a(D_r)\cos\left\{\theta_p - B_1 + (D_r)\left(t_i - \frac{R_g + r_p\theta_p}{S_{pt}}\right)\right\} -\\
& S_p\left(t_e - t_a - \frac{L_d}{S_{pd}}\right)\left(\frac{D_r}{2}\right)\frac{\partial t_e}{\partial t_i} \cdot \\
& \cos\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} -\\
& S_p \frac{\partial t_e}{\partial t_i} \sin\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} -\\
& L_d D_r \frac{\partial t_e}{\partial t_i} \cos\left\{\theta_p - B_1 + \left(\frac{D_r}{2}\right)\left(2t_e - \frac{L_d}{S_{pd}} - 2\frac{R_g + r_p\theta_p}{S_{pt}}\right)\right\}
\end{aligned}
$$

and $$
\begin{aligned}
C13 = {} & \frac{\partial e}{\partial \theta_p} \qquad (24)\\
= {} & -r_p\sin(\theta_p - B_1) -\\
& S_p\left(t_a - \frac{R_g + r_p\theta_p}{S_{pt}}\right)\left(\frac{1 - D_r r_p}{2S_{pt}}\right) \cdot \\
& \cos\left\{\theta_p - B_1 + \left(\frac{D_r}{2}\right)\left(t_a - \frac{R_g + r_p\theta_p}{S_{pt}}\right)\right\} +\\
& \frac{S_p r_p}{S_{pt}} \sin\left\{\theta_p - B_1 + \left(\frac{D_r}{2}\right)\left(t_a - \frac{R_g + r_p\theta_p}{S_{pt}}\right)\right\} -\\
& S_p\left(t_e - t_a - \frac{L_d}{S_{pd}}\right)\left(1 - \frac{D_r r_p}{S_{pt}}\right) \cdot \\
& \cos\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} -\\
& (L_d)\left(1 - \frac{D_r r_p}{S_{pt}}\right)\cos\left\{\theta_p - B_1 + \left(\frac{D_r}{2}\right)\left(2t_e - \frac{L_d}{S_{pd}} - 2\frac{R_g + r_p\theta_p}{S_{pt}}\right)\right\} -\\
& S_{ps}(t_i - t_e)\left(1 - \frac{D_r r_p}{S_{pt}}\right) \cdot \cos\left\{\theta_p - B_1 + \left(\frac{D_r}{2}\right)\left(t_i + t_e - 2\frac{R_g + r_p\theta_p}{S_{pt}}\right)\right\} -\\
& L_a\left(1 - \frac{D_r r_p}{S_{pt}}\right)\cos\left\{\theta_p - B_1 + (D_r)\left(t_i - \frac{R_g + r_p\theta_p}{S_{pt}}\right)\right\}
\end{aligned}
$$

and $$C_{21} = \frac{\partial f}{\partial t_a} \tag{25}$$

$$= r_c \frac{\partial \theta_c}{\partial t_a} \cos(A - \theta_c) + S_c \cos(A) +$$

$$L_m \frac{\partial \theta_c}{\partial t_a} \sin(A - \theta_c) + \frac{\partial L_m}{\partial t_a} \cos(A - \theta_c) -$$

$$S_p \left( t_a - \frac{R_g + r_p \theta_p}{S_{pt}} \right) \left( \frac{D_r}{2} \right) \sin \left\{ \theta_p - B_1 + \left( \frac{D_r}{2} \right) \left( t_a - \frac{R_g + r_p \theta_p}{S_{pt}} \right) \right\} +$$

$$S_p \cos \left\{ \theta_p - B_1 + \left( \frac{D_r}{2} \right) \left( t_a - \frac{R_g + r_p \theta_p}{S_{pt}} \right) \right\} -$$

$$S_p \left( t_e - t_a - \frac{L_d}{S_{pd}} \right) \left( \frac{D_r}{2} \right) \sin \left\{ \theta_p - B_1 + \left( \frac{D_r}{2} \right) \left( t_a + t_e - \frac{L_d}{S_{pd}} - 2 \frac{R_g + r_p \theta_p}{S_{pt}} \right) \right\} -$$

$$S_p \cos \left\{ \theta_p - B_1 + \left( \frac{D_r}{2} \right) \left( t_a + t_e - \frac{L_d}{S_{pd}} - 2 \frac{R_g + r_p \theta_p}{S_{pt}} \right) \right\}$$

and $$C_{22} = \frac{\partial f}{\partial t_i} \tag{26}$$

$$= r_c \frac{\partial \theta_c}{\partial t_i} \cos(A - \theta_c) + L_m \frac{\partial \theta_c}{\partial t_i} \sin(A - \theta_c) + \frac{\partial L_m}{\partial t_i} \cos(A - \theta_c) -$$

$$S_{ps}(t_i - t_e) \left( \frac{D_r}{2} \right) \left( 1 + \frac{\partial t_e}{\partial t_i} \right) \cdot$$

$$\sin \left\{ \theta_p - B_1 + \left( \frac{D_r}{2} \right) \left( t_i + t_e - 2 \frac{R_g + r_p \theta_p}{S_{pt}} \right) \right\} +$$

$$S_{ps} \left( 1 - \frac{\partial t_e}{\partial t_i} \right) \cos \left\{ \theta_p - B_1 + \left( \frac{D_r}{2} \right) \left( t_i + t_e - 2 \frac{R_g + r_p \theta_p}{S_{pt}} \right) \right\} -$$

$$L_a(D_r) \sin \left\{ \theta_p - B_1 + (D_r) \left( t_i - \frac{R_g + r_p \theta_p}{S_{pt}} \right) \right\} -$$

$$S_p \left( t_e - t_a - \frac{L_d}{S_{pd}} \right) \left( \frac{D_r}{2} \right) \cdot$$

$$\frac{\partial t_e}{\partial t_i} \sin \left\{ \theta_p - B_1 + \left( \frac{D_r}{2} \right) \left( t_a + t_e - \frac{L_d}{S_{pd}} - 2 \frac{R_g + r_p \theta_p}{S_{pt}} \right) \right\} +$$

$$S_p \frac{\partial t_e}{\partial t_i} \cos \left\{ \theta_p - B_1 + \left( \frac{D_r}{2} \right) \left( t_a + t_e - \frac{L_d}{S_{pd}} - 2 \frac{R_g + r_p \theta_p}{S_{pt}} \right) \right\} -$$

$$L_d D_r \frac{\partial t_e}{\partial t_i} \sin \left\{ \theta_p - B_1 + \left( \frac{D_r}{2} \right) \left( 2t_e - \frac{L_d}{S_{pd}} - 2 \frac{R_g + r_p \theta_p}{S_{pt}} \right) \right\}$$

and $$C23 = \frac{\partial f}{\partial \theta_p} \tag{27}$$

$$= r_p\cos(\theta_p - B_1) -$$

$$S_p\left(t_a - \frac{R_g + r_p\theta_p}{S_{pt}}\right)\left(\frac{1 - D_r r_p}{2S_{pt}}\right) \cdot$$

$$\sin\left\{\theta_p - B_1 + \left(\frac{D_r}{2}\right)\left(t_a - \frac{R_g + r_p\theta_p}{S_{pt}}\right)\right\} -$$

$$\frac{S_p r_p}{S_{pt}}\cos\left\{\theta_p - B_1 + \left(\frac{D_r}{2}\right)\left(t_a - \frac{R_g + r_p\theta_p}{S_{pt}}\right)\right\} -$$

$$S_p\left(t_e - t_a - \frac{L_d}{S_{pd}}\right)\left(1 - \frac{D_r r_p}{S_{pt}}\right) \cdot$$

$$\sin\left\{\theta_p - B_1 + \left(\frac{D_r}{2}\right)\left(t_a + t_e - \frac{L_d}{S_{pd}} - 2\frac{R_g + r_p\theta_p}{S_{pt}}\right)\right\} -$$

$$(L_d)\left(1 - \frac{D_r r_p}{S_{pt}}\right)\sin\left\{\theta_p - B_1 + \left(\frac{D_r}{2}\right)\left(2t_e - \frac{L_d}{S_{pd}} - 2\frac{R_g + r_p\theta_p}{S_{pt}}\right)\right\} -$$

$$S_{ps}(t_i - t_e)\left(1 - \frac{D_r r_p}{S_{pt}}\right)\sin\left\{\theta_p - B_1 + \left(\frac{D_r}{2}\right)\left(t_i + t_e - 2\frac{R_g + r_p\theta_p}{S_{pt}}\right)\right\} -$$

$$L_a\left(1 - \frac{D_r r_p}{S_{pt}}\right)\sin\left\{\theta_p - B_1 + (D_r)\left(t_i - \frac{R_g + r_p\theta_p}{S_{pt}}\right)\right\}$$

and $$C31 = \frac{\partial g}{\partial t_a} \tag{28}$$

$$= 2\{PAR1\} \cdot$$

$$\left[-S_p\left(t_a - \frac{R_g + r_p\theta_p}{S_{pt}}\right)\left(\frac{D_r}{2}\right)\cos\left\{\theta_p - B_1 + \left(\frac{D_r}{2}\right)\left(t_a - \frac{R_g + r_p\theta_p}{S_{pt}}\right)\right\} -$$

$$S_p\sin\left\{\theta_p - B_1 + \left(\frac{D_r}{2}\right)\left(t_a - \frac{R_g + r_p\theta_p}{S_{pt}}\right)\right\} + S_c\sin(A)\right] +$$

$$2\{PAR2\}\left[-S_c\cos(A) -\right.$$

$$\left\{-S_p\left(t_a - \frac{R_g + r_p\theta_p}{S_{pt}}\right)\left(\frac{D_r}{2}\right)\sin\left\{\theta_p - B_1 + \left(\frac{D_r}{2}\right)\left(t_a - \frac{R_g + r_p\theta_p}{S_{pt}}\right)\right\} +$$

$$\left.S_p\cos\left\{\theta_p - B_1 + \left(\frac{D_r}{2}\right)\left(t_a - \frac{R_g + r_p\theta_p}{S_{pt}}\right)\right\}\right\}\right]$$

and $$C32 = \frac{\partial g}{\partial t_i} = 0 \tag{29}$$

and

Figure 5A:
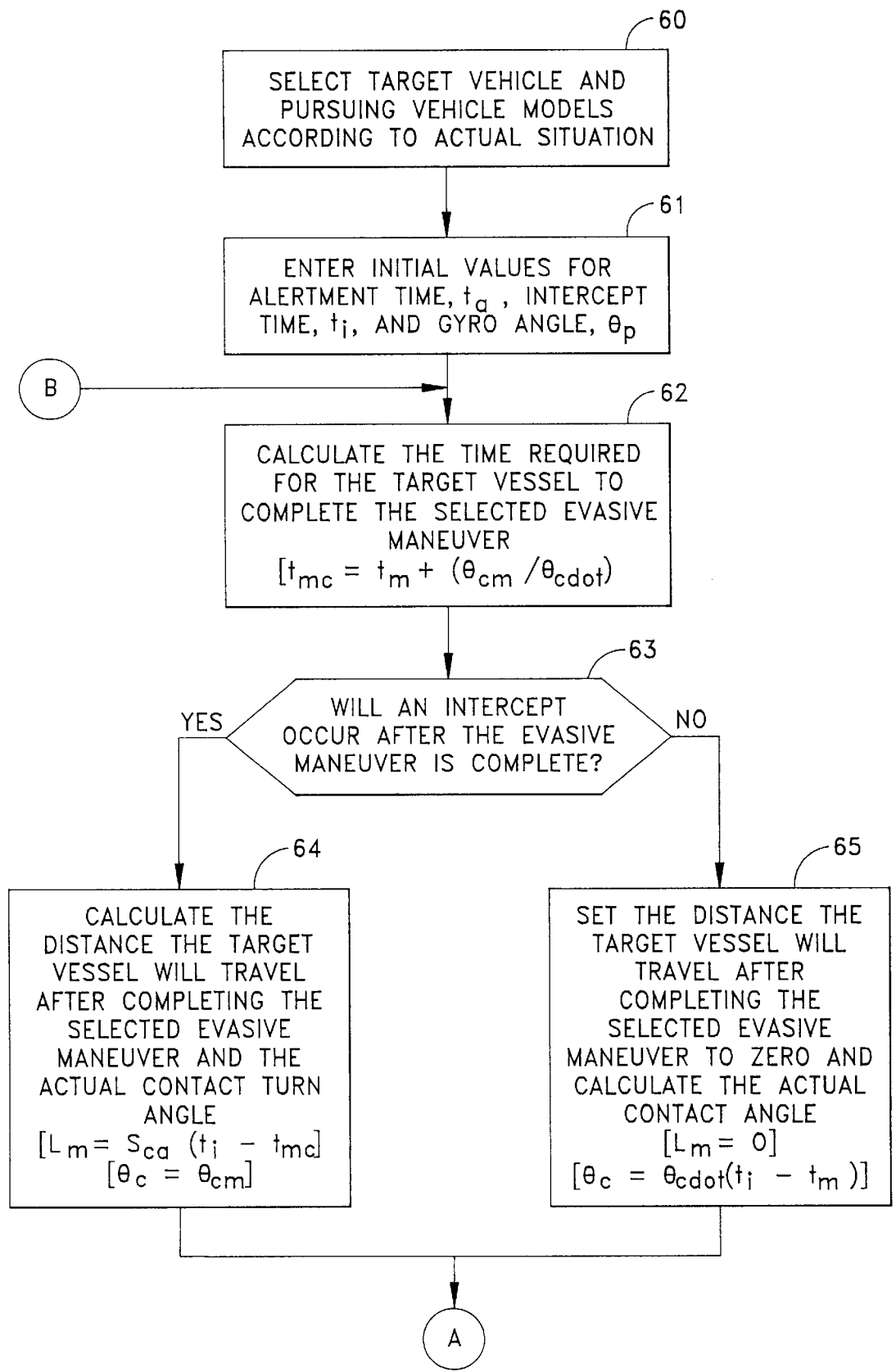
FIGS. 5A and 5B depict the operation of the evading target vehicle intercept unit in FIG. 4.
Figure 5B:
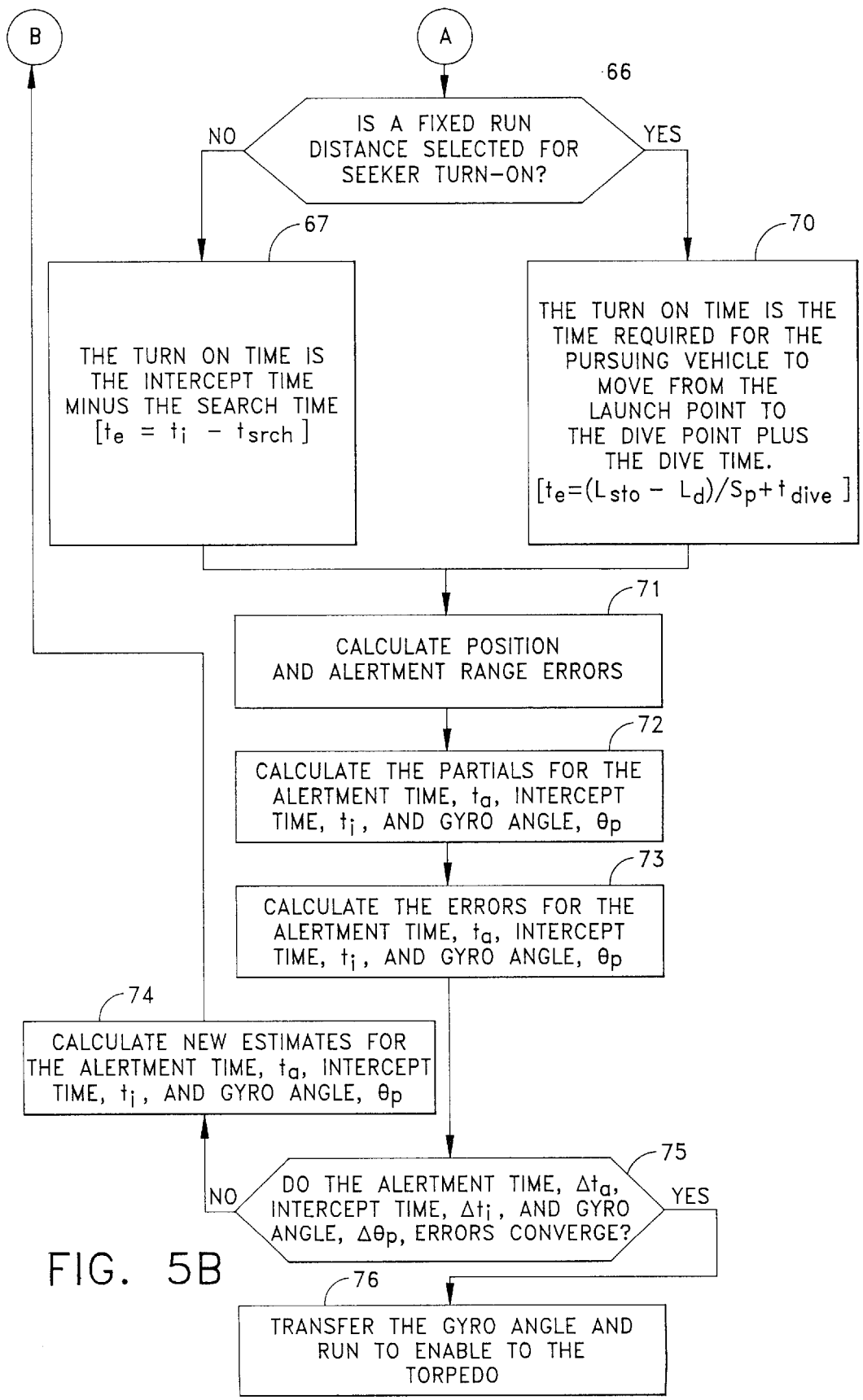

-continued $$C33 = \partial g/\partial \theta_p \tag{30}$$

$$= 2PAR1 \left[ -r_p\sin(\theta_p - B_1) - \right.$$

$$S_p\left(t_a - \frac{R_g + r_p\theta_p}{S_{pt}}\right)\left(1 - \frac{D_r r_p}{2S_{pt}}\right)\cos\left\{\theta_p - B_1 + \left(\frac{D_r}{2}\right)\left(t_a - \frac{R_g + r_p\theta_p}{S_{pt}}\right)\right\} +$$

$$\frac{S_p r_p}{S_{pt}}\sin\left\{\theta_p - B_1 + \left(\frac{D_r}{2}\right)\left(t_a - \frac{R_g + r_p\theta_p}{S_{pt}}\right)\right\}\right] +$$

$$2PAR2 \cdot \left[ -\left\{ r_p\cos(\theta_p - B_1) - \right. \right.$$

$$S_p\left(t_a - \frac{R_g + r_p\theta_p}{S_{pt}}\right)\left(1 - \frac{D_r r_p}{2S_{pt}}\right)\sin\left\{\theta_p - B_1 + \left(\frac{D_r}{2}\right)\left(t_a - \frac{R_g + r_p\theta_p}{S_{pt}}\right)\right\} -$$

$$\left(\frac{S_p r_p}{S_{pt}}\right)\cos\left\{\theta_p - B_1 + \left(\frac{D_r}{2}\right)\left(t_a - \frac{R_g + r_p\theta_p}{S_{pt}}\right)\right\}\right]\right]$$

where, $$PAR1 = L_{xr} - r_p\cos(B_1) + r_p\cos(\theta_p - B_1) - \tag{31}$$

$$S_p\left(t_a - \frac{R_g + r_p\theta_p}{S_{pt}}\right)\sin\left\{\theta_p - B_1 + \left(\frac{D_r}{2}\right)\left(t_a - \frac{R_g + r_p\theta_p}{S_{pt}}\right)\right\} +$$

$$S_c t_a \sin(A)$$

and $$PAR2 = R_c - S_c t_a \cos(A) - \{L_{yr} + r_p\sin(B_1) + r_p\sin(\theta_p - B_1) + \tag{32}$$

$$S_p\left(t_a - \frac{R_g + r_p\theta_p}{S_{pt}}\right)\cos\left\{\theta_p - B_1 + \left(\frac{D_r}{2}\right)\left(t_a - \frac{R_g + r_p\theta_p}{S_{pt}}\right)\right\}\right\}$$

and for $t_i > t_{mc}$: $L_m = S_{ca}(t_i - t_a - t_{st} - r_c(\theta_{cm})/S_{ct})$; $\partial L_m/\partial t_a = -S_{ca}$ and $\partial \theta_c/\partial t_a = 0$ $t_i \leq t_{mc}$: $L_m = 0$; $\partial L_m/\partial t_a = 0$ and $\partial \theta_c/\partial t_a = -\theta_c \text{dot}$ and when $L_{sto}$ is selected: $t_e = (L_{sto} - L_d)/S_p + L_d/S_{pd}$; $\partial t_e/\partial t_i = 0$ $L_{sto}$ not selected: $t_e = t_i - L_o/S_{ps}$; $\partial t_e/\partial t_i = 1$ FIG. 5 depicts an operation of the evading target vehicle intercept unit 40 shown in FIG. 4 particularly adapted for applications in which both the launching and target vehicles are submarines and the pursuing vehicle is a torpedo. In this application, primary guidance parameters to be transferred to the torpedo prior to launch include an initial gyro angle, and the distance from the torpedo launch point 32 in FIG. 1 and the point 25 at which the acoustic seeker is enabled, commonly the run to enable. The launching vessel determines the range, bearing, course and speed of the target ship and normally can classify the target ship based on prior historical information to obtain estimates of other information such as the alertment range, $R_a$, the typical turn rate, $\theta_{cdot}$, radius, $r_c$, at which the target vessel can turn during an evasive maneuver, and the reaction time, or time delay, between alertment and the beginning of an evasive maneuver. For a given tactical situation it also is possible to define particular parameters of the torpedo itself. Consequently in step 60 of FIG. 5 the evading target vehicle intercept unit 40 of FIG. 4 responds to the foregoing and other parameters to select appropriate position equations from the target vehicle position system 41 and the pursuing vehicle position system 42.

The evading target vehicle intercept unit 40 in FIG. 4 then uses the various equations, as previously indicated, to obtain the gyro angle and the run to enable by iteratively processing a series of equations until values of the gyro angle, alertment time and intercept time converge. In FIG. 5 step 61 represents the selection of initial or estimated values of alertment time, $t_a$, intercept time, $t_i$, and initial gyro angle, $\theta_p$. In step 62 the unit 40 in FIG. 4 calculates the time for completion of the target ship maneuver, $t_{mc}$, by summing the maneuver start time, $t_m$, and the time to complete the selected evasive maneuver obtained by dividing the maneuver included angle, $\theta_{cm}$, by the predicted angular turn rate, $\theta_{cdot}$. In step 63 the unit 40 determines whether the intercept will occur after an evasive maneuver is complete. If it will, the unit 40 calculates a value, $L_m$, that is the distance from the end of the target ship maneuver to the intercept point based upon the speed of the target vessel after the maneuver is complete, $S_{ca}$, the time interval between the termination of the maneuver, $t_{mc}$, and the time to the intercept point, $t_i$. Specifically in step 64, the process determines a value for $L_m$ as follows:

$$L_m = S_{ca}(t_i - t_{mc}) \tag{33}$$

The target ship turn angle, $\theta_c$, is also set to the estimated target evasive maneuver angle, $\theta_{cm}$, for the selected evasive maneuver.

If, on the other hand, the intercept will occur during the evasive maneuver, the distance from the end of maneuver to the intercept point, $L_m$, must be zero and the actual target maneuver angle, $\theta_c$, will depend upon characteristic contact turn rate, $\theta_{cdot}$, for the target over the interval that expires between the beginning of the maneuver, $t_m$, and the intercept point, $t_i$. Specifically, in step 65, as previously stated, for example $$L_m = 0 \tag{34}$$

$$\theta_c = \theta_{cdot}(t_i - t_m) \tag{35}$$

As previously stated, it is often possible to determine the time at which an acoustic seeker turns on by one of two methods. If, in step 66, the unit 40 determines that a fixed run distance from launch to seeker turn on, or that $L_{sto}$ is not selected, step 66 diverts to step 67 whereupon the unit 40 in FIG. 4 determines the turn on time, $t_c$, as a function of the intercept time minus a search time, $t_{srch}$, that is one of the input parameters provided in step 60. Specifically:

$$t_e = t_i - t_{srch} \tag{36}$$

This time is based upon the seeker offset distance of a pursuing vehicle with an acoustic seeker or corresponding parameter of another device. If, on the other hand, it is desired to turn on the acoustic homing device a predetermined distance after launch, step 66 diverts to step 70 that defines the turn-on time as a function of the distance travelled from launch to dive point ($L_{sto}-L_d$), the distance travelled by the torpedo during any dive phase, $L_d$, the speed of the torpedo, $S_p$, and the time required for any diving maneuvers, $t_{dive}$. Specifically:

$$t_e = \frac{L_{sto} - L_d}{S_p} + t_{dive} \tag{37}$$

Next the unit 40 in FIG. 4 executes step 71 thereby to calculate equations (8), (9) and (12) as the general functions of problem unknowns. The unit 40 determines the values of the partials using equations (22) through (32) to solve for the problem unknowns in step 72. Next the unit 40 uses equations (18), (19), (20) and (21) to solve for errors as delta values, $\Delta t_a$, $\Delta t_i$ and $\Delta \theta_p$ in step 73. In this particular embodiment there must be coincident convergence for each of the alertment time, intercept time and gyro angle values. If convergence has not been reached, step 75 uses the new estimates of the problem unknowns and operation transfers back to step 62 to begin another iteration. When convergence has been achieved, step 75 diverts to step 76 representing the determination and transfer of guidance parameters to the torpedo, particularly the gyro angle, $\theta_p$, and run-to-enable.

Figure 9:
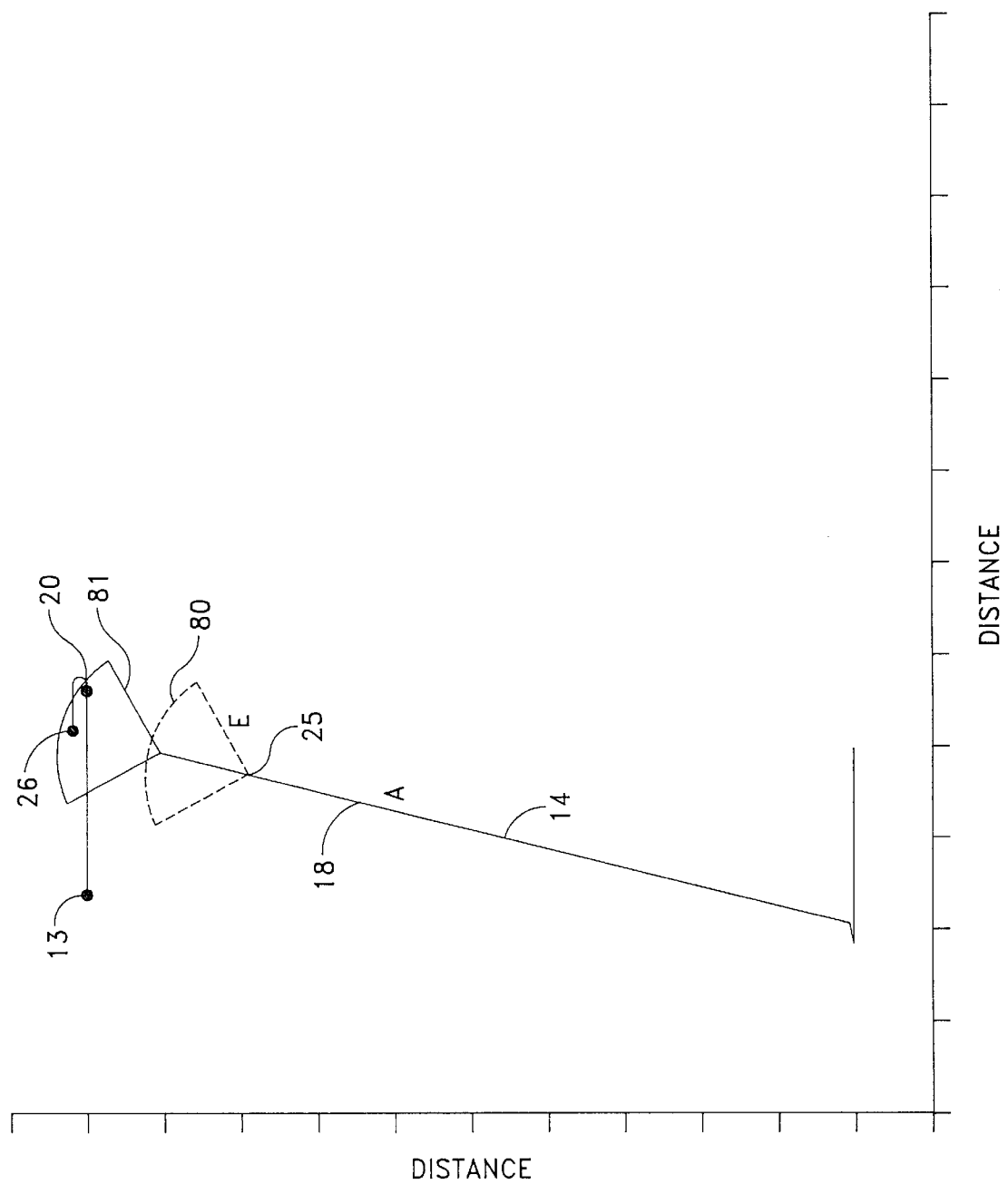
FIGS. 7 through 9 depict the values of operating parameters obtained during the pre-launch analysis of the operation shown in FIG. 6.
Figure 7:
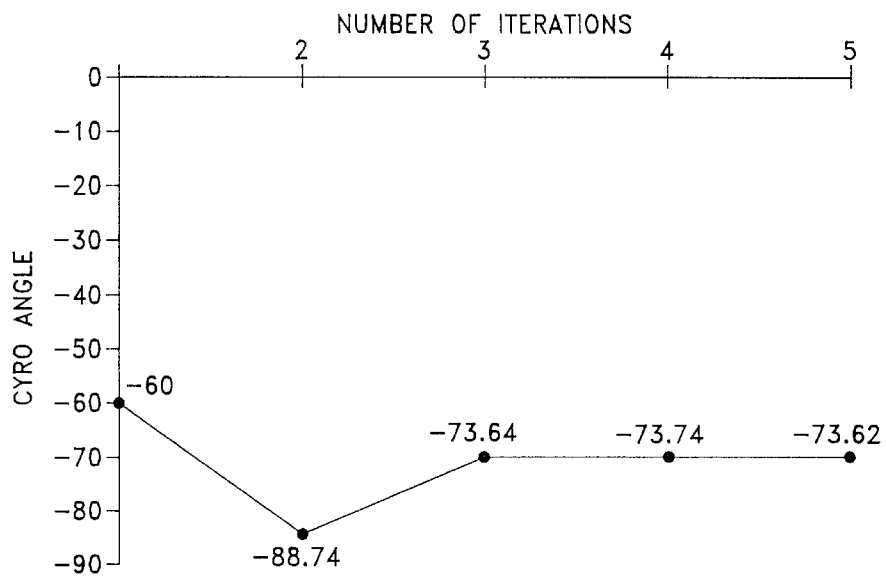
Figure 8:
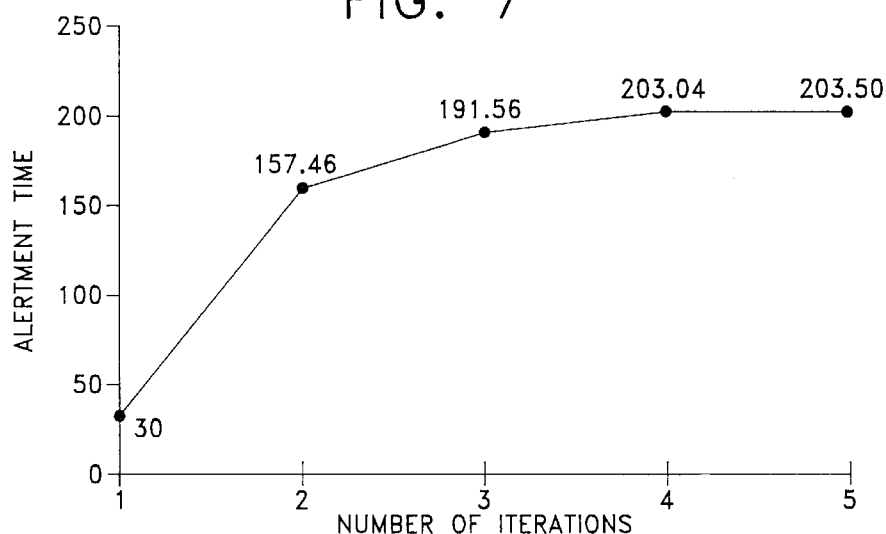
Figure 9:
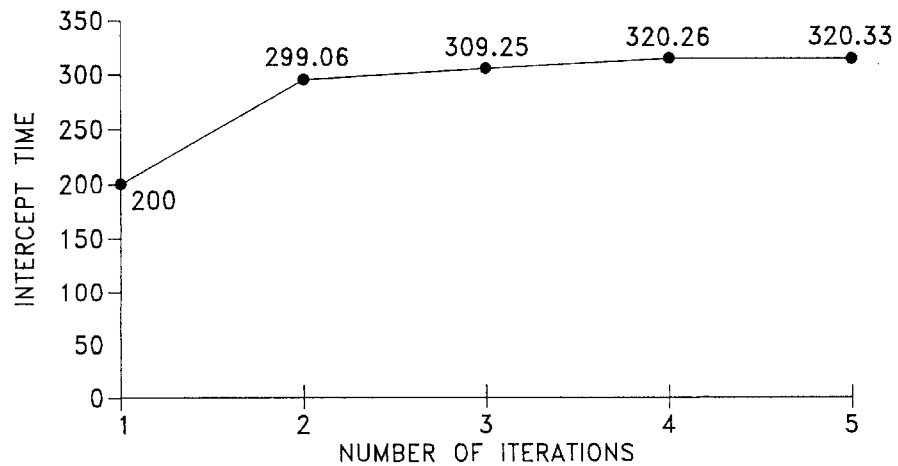

FIGS. 6 through 9 demonstrate the process in quantitative terms. In this particular example it is assumed that the target vessel will, at a fixed time after alertment, make a 180° turn to port to reverse course. When the corresponding models of the target vessel and torpedo were utilized in accordance with this invention together with appropriate other parameters, the first iteration of the process shown in FIG. 5 used assumed values of −60° for gyro angle, 30 seconds for alertment time, and 200 seconds for intercept time, as shown in FIGS. 7 through 9. At the end of the iteration, however, these numbers changed by decreasing the gyro angle to −88.74°, increasing the alertment time to 157.46 seconds and increasing the intercept time to 299.05 seconds. Convergence was not obtained. During the next iteration, each of the gyro angle, alertment time and intercept time values increased. In a third iteration, each of the values again increased, but at a reduced rate. On the fourth iteration the convergence criteria were reached. Thus it will be apparent that reasonable convergence was reached even after two iterations in this particular example. However even with four or more iterations, the control unit 40 provides the guidance parameters within a very short interval so that any delays do not affect the solution due to any change in relationships while the information is being determined.

When the resulting gyro angle and run-to-enable times were included as the guidance parameters for the given torpedo, a plot in FIG. 6 shows that a torpedo is fired along the line 14. Shortly after the alertment time shown at points 18 and 20, the target vessel begins its evasive turning maneuver at point 22. When the torpedo reaches point 25, the acoustic seeker activates to produce the response area 80 that eventually circumscribes the target vessel at the intercept point 26 as shown by the fan-like shape 81.

It has been found therefore that the process shown in FIG. 5 as implemented in the evading target vehicle unit 40 in FIG. 4 can reach convergence and can produce valid guidance information for the torpedo in a short interval. This invention also enables the consideration of solutions for a pursuing vehicle that undergoes multiple speed changes, depth changes and drifts and has different sensor activation criteria. More importantly, however, the system also accounts for the responses of a target vehicle to the presence of a pursuing vehicle, such as a torpedo, reaction times and various evasion strategies that might be utilized. Thus the invention allows the generation of initial guidance parameters for transfer to a pursuing vehicle based upon predicted evasive tactics by a target vehicle. This facilitates the effectiveness of firing a torpedo without post-launch guidance. It will also be apparent that, while not disclosed with any specificity, the specific processes for performing the specific operations of this invention could be performed on general purpose computers, or on one or more special purpose computers that could be substituted for each of the systems shown in FIG. 4. Dedicated hardware and software might also be combined to perform the function of each system in FIG. 4.

This invention has been disclosed in terms of certain embodiments. It will be apparent that many modifications can be made to the disclosed organization of apparatus and method without departing from the invention. Therefore, it is the intent of the appended claims to cover all such variations and modifications as come within the true spirit and scope of this invention.

What is claimed is:

1. A control method for directing a pursuing vehicle from a launching vehicle to a target vehicle by supplying to guidance means in the pursuing vehicle initial guidance parameters to be used at launch wherein the launching vehicle includes target vehicle state estimation means and identification means for establishing predetermined target vehicle operating characteristics, said method comprising the steps of:

generating a representation of a characteristic trajectory from a generic model of pursuing vehicle trajectory;

generating a representation of a characteristic trajectory from a generic model of target vehicle trajectory, in response to data from the identification means;

initializing predetermined characteristics that represent the interaction of the pursuing vehicle and target vehicle trajectory representations;

iteratively propagating the trajectories in response to the values of the initialized predetermined characteristics and updated predetermined characteristics according to a plurality of approximation relationships between the representations of the pursuing vehicle and target vehicle trajectories until the solutions converge;

generating the guidance parameters from the predetermined characteristics that produce the convergence for transfer to the pursuing vehicle guidance means; and launching the pursuing vehicle in response to the transferred guidance parameters.

2. A method as recited in claim 1 wherein the generic model of pursuing vehicle trajectory defines the trajectory in terms of at least an initial turning maneuver and the generation of a representative pursuing vehicle characteristic trajectory includes generating a trajectory from the launching vehicle to a predicted intercept point.

3. A control method as recited in claim 2 wherein said step of generating the pursuing vehicle characteristic trajectory includes the step of generating an intercept time that represents the interval during which the pursuing vehicle travels from the launching vehicle to the intercept point.

4. A control method as recited in claim 1 wherein the generic model of target vehicle trajectory defines the trajectory in terms including an evasive turning maneuver at a time after the pursuing vehicle is launched and the generation of a representative target vehicle characteristic trajectory includes a trajectory from a position of the target vehicle when the pursuing vehicle is launched to a predicted intercept point.

5. A control method as recited in claim 4 wherein said step of generating the target vehicle characteristic trajectory includes the step of generating an intercept time that represents the interval required for the target vehicle to travel to the intercept point from the position of the target vehicle at the launching time of the pursuing vehicle.

6. A control method as recited in claim 1 wherein the target vehicle includes alertment means for detecting the presence of the pursuing vehicle after its launch and wherein the steps of generating the representations of pursuing vehicle and target vehicle trajectories includes the step of determining an alertment time at which the alertment means senses the presence of the pursuing vehicle.

7. A control method as recited in claim 6 wherein the generic model of the target vehicle includes an alertment range characteristic for the detection capabilities of the target vehicle and wherein said generating of guidance parameters includes the step of determining the alertment time based upon constraining the characteristic trajectories of the pursuing vehicle and the target vehicle based on the alertment range at the alertment time.

8. A control method as recited in claim 7 wherein said step of generating a representation of the pursuing vehicle trajectory prior to the alertment time includes the step of determining components including a path of the pursuing vehicle from the launching vehicle and a turn of the pursuing vehicle at a predetermined time after launch.

9. A control method as recited in claim 7 wherein said step of generating a representation of the target vehicle trajectory prior to the alertment time includes the step of determining a path of the target vehicle from its position at the time of launching the pursuing vehicle to the position of the target vehicle at the alertment time.

10. A control method as recited in claim 7 wherein the step of generating the target vehicle trajectory after the alertment time includes the steps of defining a turning movement of the target vehicle.

11. A control method as recited in claim 10 wherein the step of generating the target vehicle trajectory after the alertment time additionally includes continuing the pre-alertment time trajectory for an interval corresponding to a target vehicle reaction time before defining the turning movement of the target vehicle.

12. A control method as recited in claim 1 wherein said iterative propagating of the trajectories includes generating the updated predetermined characteristics during each iteration by solving a matrix of "n" equations and "n" unknowns.

13. A control method as recited in claim 12 wherein said step of iterative propagating includes comparing the differentials of successive values of the updated predetermined characteristics generated during successive iterations for determining whether each of the updated predetermined characteristics meets predetermined convergence criteria.

14. A control method as recited in claim 1 wherein the launching and pursuing vehicles are constituted respectively by a submarine and a torpedo with a guidance gyro and instrumentation to be enabled after the launch, the target vehicle includes alertment means for detecting the presence of the pursuing vehicle after its launch and wherein the transferred guidance parameters include a setting for gyro angle and a setting for run to enable that represents the distance from the launch to the point at which the instrumentation is to be activated, said iterative propagation of trajectories uses values of alertment time, intercept time and gyro angle as the values of the initialized and updated predetermined characteristics.

15. A control method as recited in claim 14 wherein said torpedo includes an acoustic seeker and said control method determines the time for activating the acoustic seeker by a selected one of alternate methods.

16. A control method as recited in claim 15 wherein said selected one of said alternate methods includes the step of determining the difference between the intercept time and a search time that is a characteristic of the acoustic seeker.

17. A control method as recited in claim 15 wherein said selected one of said alternate methods includes the step of determining from the launch time an interval based upon the distance over which the torpedo travels from the launch point until the acoustic seeker activates.

18. A control method as recited in claim 15 wherein the torpedo includes means for producing a dive of a predetermined length and said selected one of said alternate methods includes the step of determining from the launch time an interval based upon the distance that the torpedo travels from launch until the time the acoustic seeker activates, the distance and time consumed by any diving sequences, and torpedo speed.

19. A control method as recited in claim 15 wherein the submarine includes means for determining a range vector to the target vehicle at the time of launch and said control method determines various positions of the torpedo and the target vehicle on a coordinate system aligned with the range vector from the submarine to the target vehicle.

20. A control method as recited in claim 15 wherein said iterative propagating provides both successive solutions and solution errors for the time of intercept, time of alertment and torpedo gyro angle and compares the successive values of each of the successive errors for convergence.

21. A control method as recited in claim 20 wherein said convergence requires that the solution errors for each of the successive values of intercept time, alertment time and gyro angle at the end of a single iteration be less than a respective predetermined value for each of the solution errors.

22. A control system for directing a pursuing vehicle from a launching vehicle to an alerted and evading target vehicle by supplying to guidance means in the pursuing vehicle guidance parameters to be used at launch wherein the launching vehicle includes means for estimating target state and identification means for establishing predetermined target vehicle operating characteristics, said control system comprising:

means for generating a representation of a characteristic trajectory from a generic model of pursuing vehicle trajectory;

means for generating a representation of a characteristic trajectory from a generic model of target vehicle trajectory;

means for initializing predetermined characteristics that represent the interaction of the pursuing vehicle and target vehicle trajectory representations and associated constraints;

means for iteratively propagating the trajectories in response to values of predetermined and undated predetermined characteristics according to a plurality of approximation relationships between the representations of the pursuing vehicle and target vehicle trajectories until the solutions converge; and means for generating the guidance parameters from the predetermined characteristics that produce the convergence for transfer to the pursuing vehicle guidance means for use by the pursuing vehicle after launch.

23. A control system as recited in claim 22 wherein the target vehicle includes alertment means for detecting the presence of the pursuing vehicle after the launch of the pursuing vehicle and wherein said generating means for the representations of pursuing vehicle and target vehicle trajectories include means for determining an alertment time at which the alertment means senses the presence of the pursuing vehicle.

24. A control system as recited in claim 22 wherein said iterative propagating means includes means responsive during each iteration for obtaining the updated predetermined characteristics by solving a matrix of "n" equations and "n" unknowns.

25. A control system as recited in claim 24 wherein said iterative propagating means includes error means for comparing the differentials of successive values of the updated predetermined characteristics generated during successive iterations for determining whether each of the updated predetermined characteristics meets predetermined convergence criteria.

26. A control system as recited in claim 22 wherein the launching, pursuing and target vehicles are constituted respectively by a submarine, a torpedo with a guidance gyro and instrumentation to be enabled after the launch, and target submarine with alertment means for detecting the presence of the pursuing vehicle after its launch, wherein the guidance parameters transferred to the torpedo include settings for gyro angle and a run to enable that represents the distance from the launch to the point at which the instrumentation is to be activated and wherein said guidance parameters generating means provides values of alertment time, intercept time and gyro angle.

27. A control system as recited in claim 26 wherein the submarine includes means for determining a range vector to the target vehicle at the time of launch and said control system generating means determines various positions of the torpedo and the target vehicle on a coordinate system aligned with the range vector from the submarine to the target vehicle.

28. A control system as recited in claim 26 wherein said iterative propagating means includes error means for producing solution errors in response to successive solutions for each of the time of intercept, time of alertment and torpedo gyro angle.

29. A control system as recited in claim 26 wherein said iterative propagating means includes error means for comparing successive values of the solution errors at the end of an iteration and enabling the generation of said guidance parameters when the result of each of the comparisons is within a predetermined range.

* * * * *